UNITED STATES PATENT OFFICE.

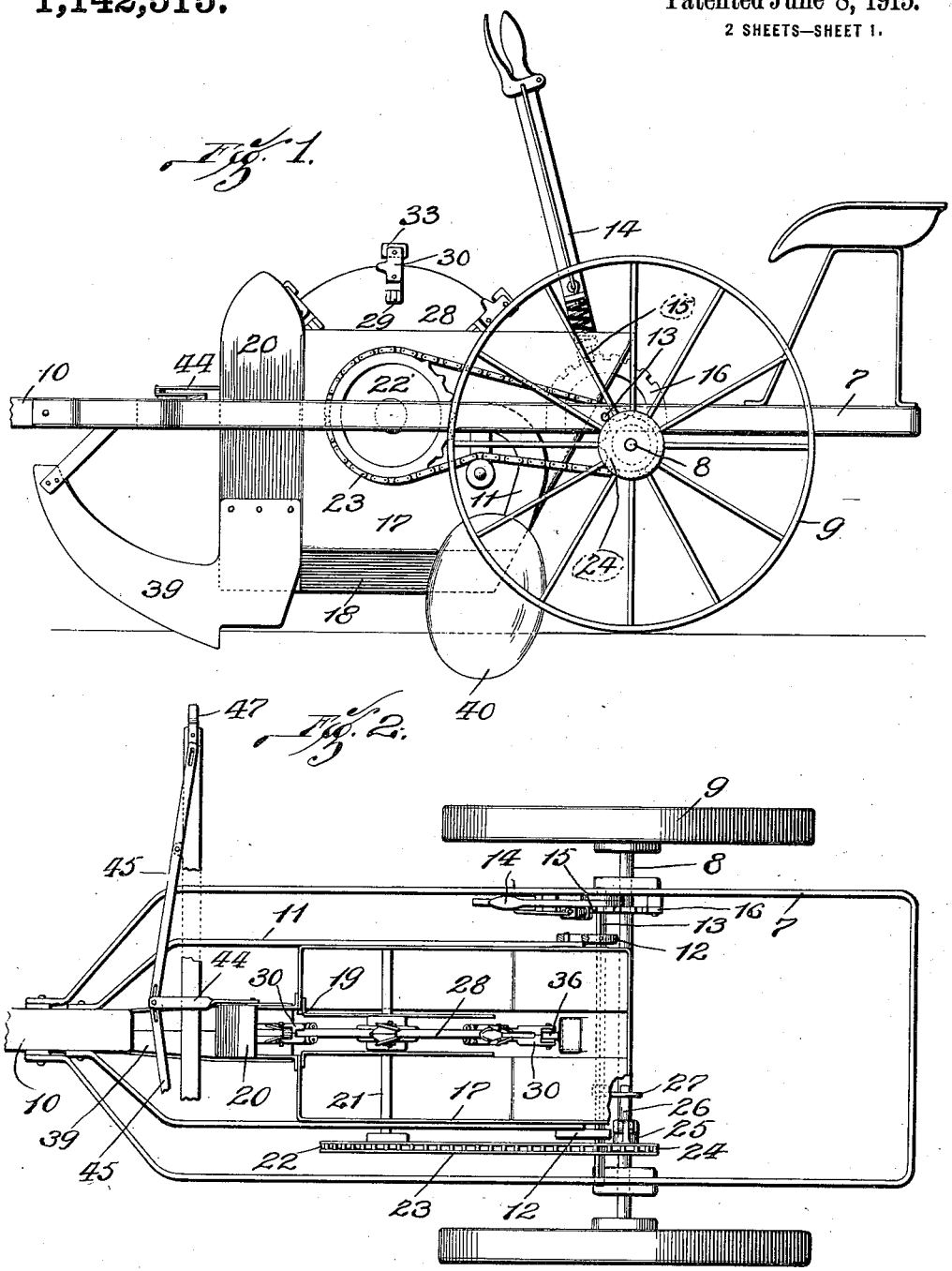

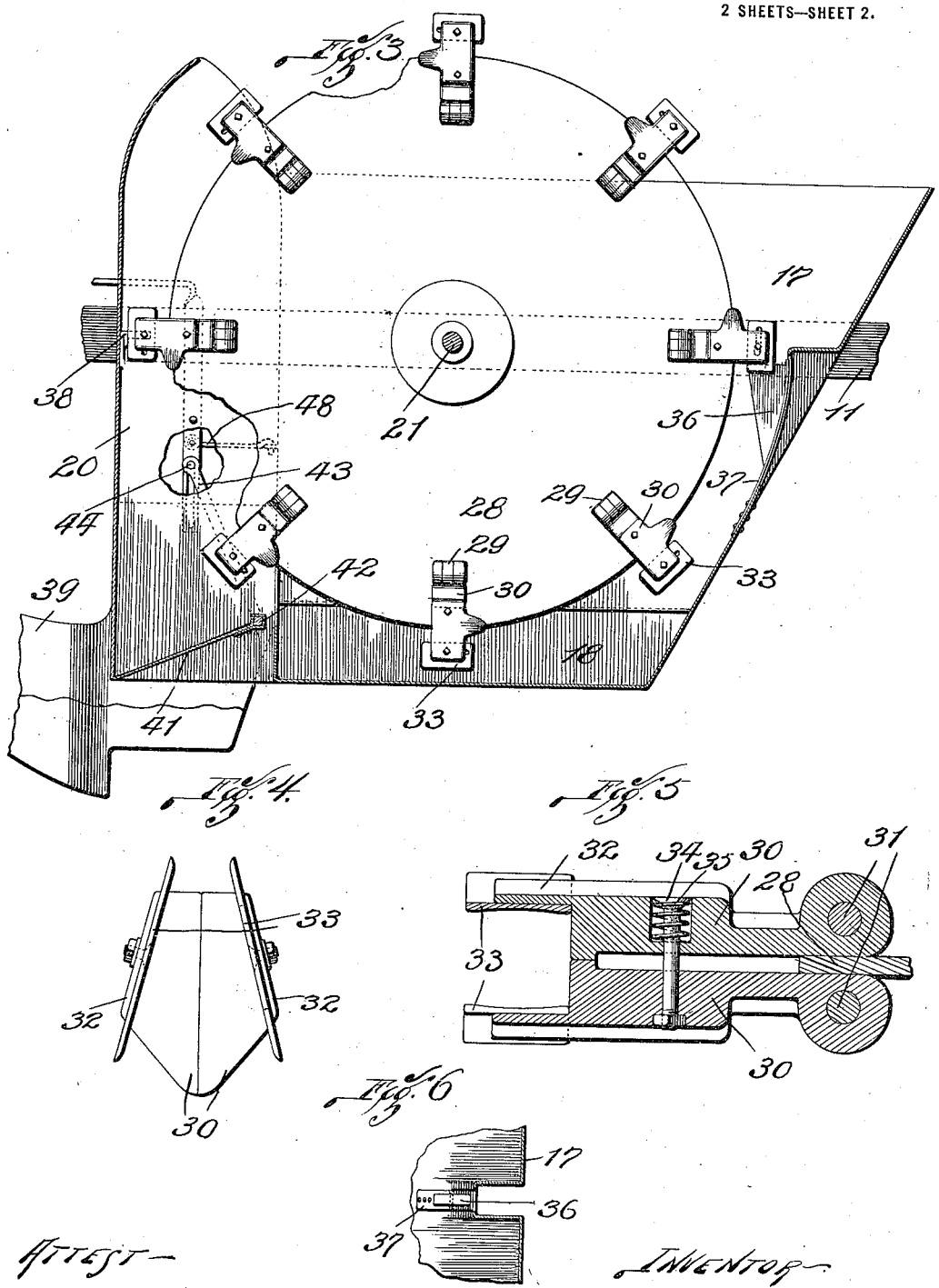

THOMAS L. GOOD, OF EDWARDSVILLE, ILLINOIS, ASSIGNOR OF ONE-HALF TO MAY A. S. P. GOOD, OF EDWARDSVILLE, ILLINOIS.

POTATO-PLANTER.

1,142,515.

Specification of Letters Patent.

Patented June 8, 1915.

Application filed May 8, 1914. Serial No. 837,110.

*To all whom it may concern:*

Be it known that I, THOMAS L. GOOD, a citizen of the United States, and resident of Edwardsville, Madison county, Illinois, have invented certain new and useful Improvements in Potato-Planters, of which the following is a specification, containing a full, clear, and exact description, reference being had to the accompanying drawings, forming a part hereof.

My invention relates to improvements in potato planters, and the object of my invention is to construct a planter having a series of pickers, each of which comprises a pair of yielding jaws arranged to hold a seed potato in such manner as to minimize imperfect dropping due to potatoes being forcibly expelled from the pickers before reaching the dropping point and to arrange at the dropping point a device designed to act directly on the potato held by the picker to expel the potato from the picker.

The above and other objects will be made more clear in the following specification, pointed out in my claims and illustrated by the accompanying drawings, in which—

Figure 1 shows a side elevation of a planter constructed according to my invention; Fig. 2 is a plan view of the planter with certain parts broken away and the seat removed; Fig. 3 is a sectional elevation on an enlarged scale showing the hopper and picking mechanism; Fig. 4 is an end elevation of a pair of the picker jaws; Fig. 5 is a longitudinal sectional elevation of a pair of the picker jaws and their pivotal connection with the supporting disk; and Fig. 6 is a detail plan of a means for fully seating the potatoes in the pickers.

Referring by numerals to the accompanying drawings: 7 designates the main frame of the planter, which carries the axle 8 upon which the supporting wheels 9 are secured, and the main frame has secured thereto the tongue 10.

11—11 designate auxiliary frame members, each of which is pivotally secured at its forward end to the tongue, and each having its body portion extended approximately parallel with the side portions of the main frame.

At the rear end of each of the auxiliary frame members there is pivotally carried an arm 12, and each of said arms 12 is non-rotatively secured to a shaft 13 carried by the main frame 7.

In order to raise and lower the auxiliary frame relative to the main frame for purposes hereinafter made clear, I have provided a lever 14 which is arranged to rock the shaft 13 and through the arms 12 elevate the rear ends of the auxiliary frame members 11. Accompanying the lever 14 is the usual pawl and sector 15 and 16, respectively.

Secured to and supported solely by the auxiliary frame members 11—11 is a hopper 17, in the bottom of which there is a longitudinal channel 18. The front wall of the hopper is provided with a vertically disposed opening 19 and surrounding this opening on the outside of the hopper is an open topped and open bottomed boot 20.

Extended transversely through the hopper and having its ends journaled in the frame members 11 is a shaft 21 carrying at its one end outside the hopper a sprocket wheel 22 embraced by a chain 23 which extends to and embraces a sprocket wheel 24 carried by the axle 8.

25 designates a clutch connection between the sprocket wheel 24 and the axle 8, which is controlled by a lever 26, lying in the path of an arm 27 carried by the shaft 13.

Mounted to rotate with the shaft 21 is a disk 28 which stands along the longitudinal median line of the hopper over the channel 18, and arranged to ride through the opening 19 in the front wall and into the boot 20.

At uniform intervals adjacent the periphery of and on each face of the disk there are uniformly spaced ears 29, which ears constitute supports for the picker bodies 30. Each of the picker bodies is hinged to one of said ears by a pin 31, and said picker bodies are arranged to present opposing jaws 32 which carry adjustable plates 33 having bolt and slot connection with the jaw to provide for adjusting the plates to fit different sized potatoes.

The free ends of the picker bodies present a "back" against which the seed potatoes are forced when seated and which prevent the potatoes from being forced beyond the plates during the seating. Through the medium of the bolt 34 and spring 35, the picker bodies and the plates are normally drawn toward each other and are never mechanically separated except when in the act of picking a potato from the hopper, wherein the potato itself tends to spread the plates against the tension of the spring 35.

Arranged in the path of the pickers preferably on the rear wall of the hopper is a wedge shaped block 36 supported on a leaf spring 37, and whose function it is to fully seat the potatoes between the plates of the pickers, so that the potatoes will not be dislodged between the picking and dropping.

To the forward wall and on the inside of the boot 20, in the path of the pickers, is a fixed projection 38 arranged to directly engage each potato carried by the pickers and forcibly expel the potatoes from between the resiliently held picker plates.

39 designates a planter shoe or furrow opener, which is pivotally secured at its forward end to the frame of the machine and at its rear end to the boot of the hopper. This shoe is bifurcated at its rear end and straddles the lowermost end of the boot so that the potatoes may be dropped between the sides of the shoe.

40 designates the disks or furrow closers which are carried by the downturned rear ends of the auxiliary frame members 11. Extending across the bottom of the boot is a valve plate 41 mounted on a shaft 42 extended transversely through the boot and having connected therewith an arm 43 which in turn has a pin and slot connection with a bell crank lever 44 pivotally mounted on the side of the boot. This bell crank lever 44 is connected at its forward end to a pair of levers 45 pivotally supported on the machine frame in advance of the boot and which extend in opposite directions transversely of the machine and which are pivotally connected at their outer ends to forks 47 (one only of which is shown) which are arranged to be operated by an ordinary check wire not shown.

It will thus be seen that I have constructed a machine which may be used either as a "check row" planter or a "drill". When used as a drill, the valve plate 41 is held open by means of a hook 48.

Having thus fully described my invention, what I declare to be new and desire to secure by Letters Patent of the United States is:

1. In a potato planter, the combination with a rotating carrier and a picker comprising a pair of resiliently mounted jaws of a stationary element mounted in the path of a potato held by said jaws.

2. In a potato planter, the combination with a rotating carrier, a picker comprising a pair of jaws mounted on said carrier and a spring arranged to normally draw said jaws together, of a potato ejector fixedly secured in a position where said jaws will straddle said ejector in their movement.

3. In a potato planter, a hopper, a tractor driven rotatable element in said hopper, uniformly spaced pairs of jaws carried by the rotatable element, and a fixed element lying between the paths of the jaws of each pair to eject the potatoes from said jaws without engaging the jaws.

4. In a planter of the class described, a tractor driven element having uniformly spaced pickers, each comprising a pair of jaws, which are normally spring held together, a hopper through which said pickers travel, a yielding mounted device mounted in the path of potatoes carried by the pickers for fully seating the potatoes between the jaws of the pickers and a rigid device in the path of the potatoes carried by said pickers to expel the potatoes from the pickers.

In testimony whereof, I have signed my name to this specification, in presence of two subscribing witnesses.

THOMAS L. GOOD.

Witnesses:
J. B. DALE,
ED A. COBIRN.

Copies of this patent may be obtained for five cents each, by addressing the "Commissioner of Patents, Washington, D. C."